United States Patent [19]

Douglas et al.

[11] 4,201,922
[45] May 6, 1980

[54] AUTOMATIC START/MANUAL START INTERLOCK SYSTEM FOR A GAS TURBINE ENGINE

[75] Inventors: Orva H. Douglas; Quinciano G. Mendoza, both of Bellevue, Wash.

[73] Assignee: The Boeing Company, Seattle, Wash.

[21] Appl. No.: 913,152

[22] Filed: Jun. 6, 1978

Related U.S. Application Data

[63] Continuation of Ser. No. 750,301, Dec. 13, 1976, abandoned.

[51] Int. Cl.² ............................................. B60K 33/00
[52] U.S. Cl. .................................. 290/38 R; 318/446
[58] Field of Search .............. 290/36, 38, DIG. 1, 290/DIG. 3; 318/446, 590, 591; 74/479; 60/39.14, 39.28

[56] References Cited

U.S. PATENT DOCUMENTS

| | | | |
|---|---|---|---|
| 2,753,499 | 7/1956 | Dion | 318/591 X |
| 3,790,806 | 2/1974 | Lessard | 290/38 X |
| 3,937,014 | 2/1976 | Plant | 60/39.28 X |
| 3,938,320 | 2/1976 | Nelson | 60/39.14 |

FOREIGN PATENT DOCUMENTS 548123  9/1942  United Kingdom ..................... 318/446

*Primary Examiner*—Gene Z. Rubinson
*Assistant Examiner*—W. E. Duncanson, Jr.
*Attorney, Agent, or Firm*—Lynn H. Hess; B. A. Donahue

[57] ABSTRACT

An interlock system for manual and automatic starting of a turbine engine in which the automatic system is independent of the manual system, and in which the automatic and manual systems are prevented from interfering with each other. This is accomplished with a dedicated computer and electronic logic circuitry which insures that the automatic start system cannot be initiated when the engine is running or when manual starting has been initiated.

20 Claims, 1 Drawing Figure

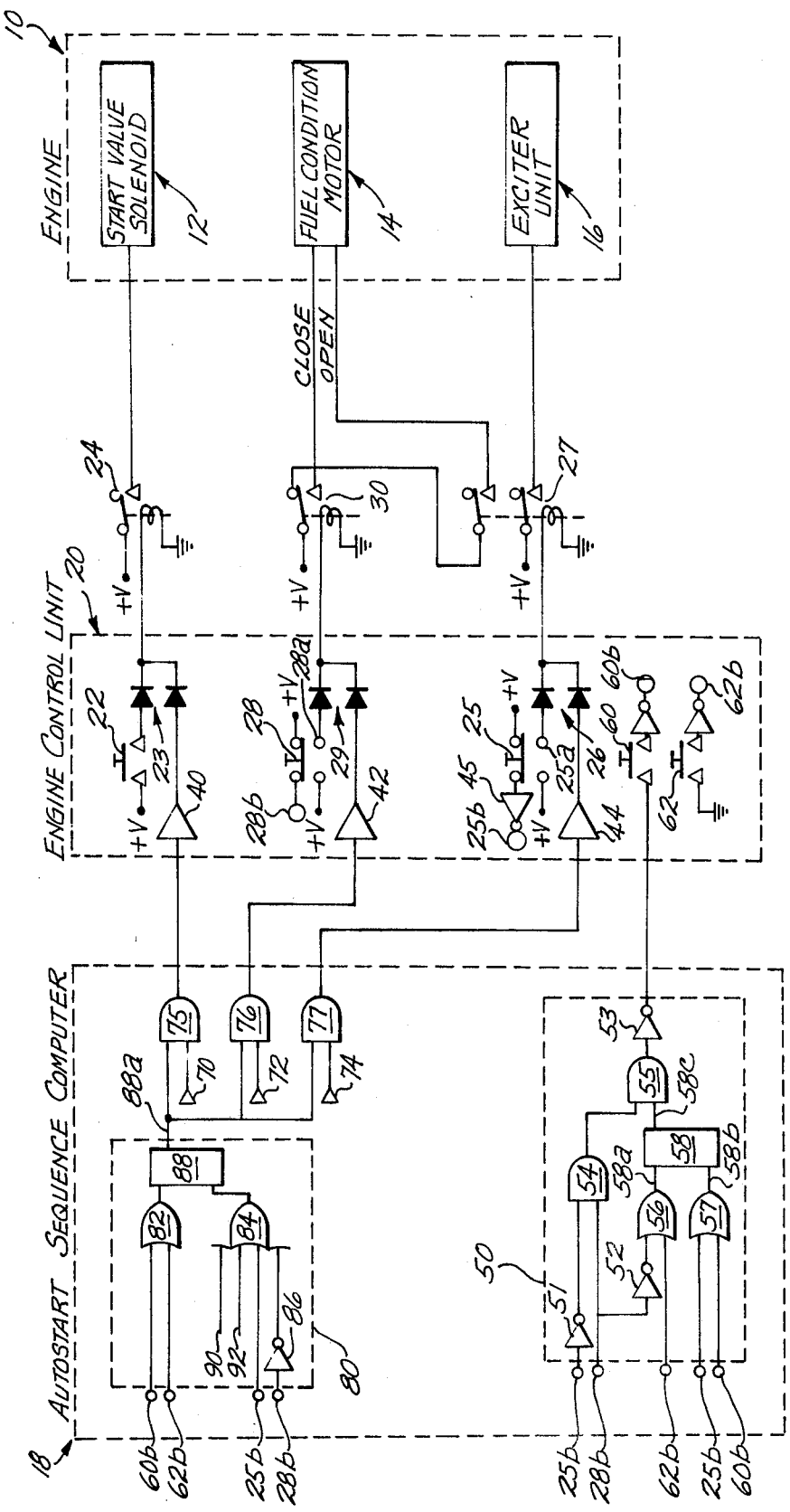

AUTOMATIC START/MANUAL START INTERLOCK SYSTEM FOR A GAS TURBINE ENGINE

This is a continuation, of application Ser. No. 750,301, filed Dec. 13, 1976 now abandoned.

FIELD OF THE INVENTION

This invention relates to a combination automatic start and manual start interlock system for a gas turbine engine in which the automatic and manual systems are prevented from interfering with each other.

BACKGROUND

When an automatic start system is added to a manual start system for a gas turbine engine, special considerations are necessary in order to minimize potentially dangerous situations both to operating personnel and to the turbine engine itself. These include, but are not limited to, damage or unnecessary inspection of the turbine engine due to incompatible operation between the automatic and manual systems; the loss of the ability to shutdown or manually continue to start the turbine engine after an unsuccessful automatic start attempt; occurrence of dangerous situations to operating personnel due to incompatible operation of the automatic and manual systems.

There have been no known prior attempts to solve this problem, partially because prior efforts on gas turbine automatic start systems did not include considerations of erroneous operation between automatic and manual systems. U.S. Pat. No. 2,866,385, granted to Miller, K. W., is an automatic start system employing stepper motor relays for use on an unmanned vehicle. Due to the nature of the stepper relays, it is not obvious what consequences will result if an automatic start sequence is interrupted and then re-initiated. U.S. Pat. No. 3,310,937, granted to Smith, E. G., is an autostart system using fixed solid state circuitry for timing and sequencing control. It does not address operational problems which might damage an engine.

BRIEF DESCRIPTION OF THE DRAWINGS

FIG. 1 is a block diagram of the present invention containing an electrical schematic of the preferred embodiment.

DESCRIPTION OF THE PREFERRED EMBODIMENT

With reference to FIG. 1, the present invention provides the interface between autostart sequence computer 18, engine control unit 20, and the engine starting equipment within engine 10. Autostart sequence computer 18 performs the sequencing, timing, and control of the automatic starting and shutdown process. Starting equipment located within engine 10 comprises start valve solenoid 12 which controls the engine pneumatic starter (not shown), an electric fuel condition motor 14 for positioning a fuel valve to either a CLOSED or an OPEN setting (using a DC motor and a plurality of limit switches), and electrical exciter unit 16 for converting a DC voltage input into the high voltage required for the engine starters (not shown). Engine control unit 20 contains the switch and indicator assemblies as well as other electronics required to amplify the command signals from both the autostart sequence computer 18 and manual switches as will be described.

Since the present invention is directed to an interlock system for both the manual and automatic starting of a typical gas turbine engine, the present invention can better be understood by describing the procedure for both the manual and automatic start-up sequences.

MANUAL START-UP SEQUENCE

Manual starting of turbine engine 10 is accomplished by pressing manual start valve switch 22 located within engine control unit 20. Switch 22, a momentary contact switch, couples a positive voltage through diode assembly 23 closing start valve relay 24 which energizes start valve solenoid 12 and causes engine 10 to crank. Start valve relay 24 is contained within engine control unit 20. Diode assembly 23 is assembled into a conventional hardwire logic OR configuration.

At a predetermined RPM speed of the engine compressor (not shown), monitored by a meter within engine control unit 20, two-position ignition and fuel switch 25 is turned to the ON position (indicated by 25a in FIG. 1). Switch 25 couples a positive voltage through diode network 26 closing high ignition and fuel relay 27. Relay 27, located within engine control unit 20, causes fuel condition motor 14 to rotate to the OPEN position and provide power to exciter unit 16.

After engine 10 reaches a predetermined speed, as monitored by another meter within engine control unit 20, manual start valve switch 22 is released. When engine 10 attains a stabilized idle condition, again as determined by a meter located within engine control unit 20, switch 25 is pressed to remove power from exciter unit 16.

Manual shutdown of engine 10 is performed by pressing two-position manual cutoff switch 28 to position 28a. Switch 28 couples a positive voltage through diode assembly 29 and activates cutoff relay 30 removing DC power from the OPEN input of fuel condition motor 14 and applies the DC power to the CLOSED input. Fuel condition motor 14 then drives the fuel valve (not shown) to the closed position.

Automatic Start-Up Sequence

The automatic start-up sequence commands parallel the manual start-up switch commands (as determined by manual switches 22, 25, and 28) through amplifiers 40, 42, and 44 located within engine control unit 20. These amplifiers are solid state electronic devices and are typically operational amplifiers. Prior to initiating any automatic start-up sequence, manual switches 22, 25, and 28 must be in the OPEN position in order to prevent interference with the operation of the automatic sequence.

Manual cutoff switch 28, output 28b, and ignition and fuel switch 25, output 25b, are inputs to a logic network shown generally at 50. Logic network 50, comprising a plurality of solid state logic inverters 51, 52, and 53, solid state logic AND gates 54 and 55, solid state logic OR gates 56 and 57, and solid state bi-state device 58 is located within autostart sequence computer 18. Switch output 25b is formed from logic inverter 45 located within engine control unit 20. Logic network 50 enables autostart switch 60 as will be described.

By pressing either manual cutoff switch 28 or automatic shutdown switch 62, bi-state device 58, output 58c, is set to a logic high condition. This is accomplished by coupling output 28b of switch 28 through inverter 52 and OR gate 56, to high toggle side 58a of device 58 (while low toggle side 58b remains low), or by coupling output 62b of switch 62 through OR gate 56 to high toggle side 58a of device 58 (again while low toggle side 58b remains low). Since both manual cutoff switch 28 and manual ignition and fuel switch 25 are in the OPEN position, logic AND gate 54 produces a high logic output which along with the logic high output produced by logic AND gate 55 forces inverter 53 output to a logic low thereby producing a ground for autostart switch 60 when pressed. Immediately after initiating a start sequence, either by pressing automatic start switch 60 or manual ignition and fuel switch 25, bi-state device 58, output 58c is set to a logic low thereby disarming autostart switch 60 and preventing re-initiation of an autostart sequence during the starting process.

After an automatic start-up sequence has been initiated (by pressing automatic start switch 60), autostart sequence computer 18 then controls the starting sequence. This is accomplished typically with the generation of start valve command signal 70, cutoff command signal 72, and high ignition and fuel on command 74.

These signals replace manually activated signals from switches 22, 25, and 28 and are generated by means within computer 18. Said signals are coupled through logic AND gates 75, 76, and 77 which have been enabled by logic network 80 as will be described, and through amplifiers 40, 42, and 44 to control engine 10 starting equipment.

A second logic network, shown generally at 80, is used to disconnect the automatic system when an automatic start or shutdown is completed or whenever manual cutoff switch 28 or manual ignition and fuel switch 25 is pressed. Network 80, comprising a plurality of logic OR gates 82, and 84, logic inverter 86, and a solid state bi-state device 88, is located within computer 18. The output of the logic network, signal 88a, is a command enable signal and is derived from bi-state device 88. This device is set to a logic high state enabling gates 75, 76, and 77 and thus signals 70, 72, and 74 from computer 18, when autostart switch 60 or auto shutdown switch 62 is pressed. Bi-state device is set to a logic low state, disabling gates 75, 76, and 77 when manual cutoff switch 28 or manual ignition and fuel switch 25 is pressed. In addition, computer 18 provides additional command signals indicating engine 10 has reached a stabilized idle condition (signal 90), and engine 10 shutdown is complete (signal 92). These signals are coupled to bi-state device 88, by logic OR gate 84, whenever they are momentarily present.

Referring generally to the drawing, in the preferred embodiment of the invention the autostart sequence computer 18 may include signal generating means (including amplifiers 40, 42, and 44) for receiving outputs 60b and 62b and for generating command signals 70, 72, and 74. The preferred embodiment of the invention as shown in the drawing also includes a signal source shown as a positive voltage on one side of relay switches 24, 27, and 30 and shown as a ground connection on one side of switch 62.

The preferred form of the invention as shown includes a control circuit comprising diode networks 23, 26, and 29 and the relay switch assemblies 24, 27, and 30. A plurality of switch means are shown in the drawing as including start switch 25 (or two start switches 22 and 25), shutdown switch 28, autostart switch 60, and auto shutdown switch 62. As shown, a first latch circuit comprises the logic network 50; and a second latch circuit comprises logic network 80 and the logic AND gates 75, 76, and 77.

The foregoing disclosure and description thereof are for illustrative purposes only and do not in any way limit the invention which is defined only by the following claims.

What is claimed is:

1. A starting apparatus for an engine, said starting apparatus comprising:
   engine starting equipment connected to the engine,
   first means for generating a sequence of first signals,
   second means for providing second signals,
   control means responsive to said first signals and said second signals for operating said engine starting equipment,
   first switch means connected to said first means for initiating the generation of said first signals,
   second switch means for selectively coupling said second signals to said control means,
   first latch means responsive to said second switch means for enabling and disabling said first switch means, and
   second latch means responsive to said second switch means for enabling and disabling said first signals.

2. A starting apparatus as claimed in claim 1 wherein said second switch means comprises a start switch connected to said second latch means and manually operable between an open position and a closed position for coupling said second signals to said control means only when in said closed position, and said second switch means further comprises a shutdown switch connected to said second latch means and manually operable between an open position and a closed position for coupling said second signals to said control means only when in said closed position, said second latch means responsive to said start switch and to said shutdown switch for disabling said first signals whenever either of said start switch and said shutdown switch is in the closed position.

3. A starting apparatus as claimed in claim 1 wherein said first switch means comprises an autostart switch connected to said second latch means and operable between an open position and a closed position for initiating the generation of said sequence of first signals only when operated to said closed position, said second latch means responsive to said autostart switch for enabling said first signals whenever said autostart switch is operated to said closed position while said autostart switch is enabled.

4. A starting apparatus as claimed in claim 1 wherein said first means includes means for generating a sequence of shutdown signals, and said starting apparatus includes third switch means connected to said first means for initiating the generation of said sequence of shutdown signals, said third switch means comprising an auto shutdown switch operable between an open position and a closed position for initiating the generation of said sequence of shutdown signals only when operated to said closed position, said second latch means responsive to said auto shutdown switch for enabling said shutdown signals whenever said auto shutdown switch is operated to said closed position.

5. A starting apparatus as claimed in claim 1 wherein said first means includes means for generating a momentary signal indicating a stabilized idle engine condition and means for generating a momentary signal indicating a completed shutdown engine condition, said second latch means responsive to said momentary signal indicating said stabilized idle engine condition for disabling said first signals.

6. A starting apparatus as claimed in claim 1 wherein said first means includes means for generating a sequence of shutdown signals and for generating a momentary signal indicating a completed shutdown engine condition, and said control means is responsive to said first signals, said second signals, and said shutdown signals for operating said engine starting equipment, said second latch means responsive to said momentary signal indicating said completed shutdown engine condition for disabling said shutdown signals.

7. A starting apparatus as claimed in claim 1 wherein:
said first means includes means for generating a sequence of shutdown signals and said starting apparatus includes third switch means connected to said first means for initiating the generation of said sequence of shutdown signals;
said first means further including means for generating a momentary signal indicating a stabilized idle engine condition and means for generating a momentary signal indicating a completed shutdown engine condition;
said first switch means including an autostart switch connected to said second latch means and operable between an open position and a closed position for initiating the generation of said sequence of first signals only when operated to said closed position;
said second switch means comprising a start switch connected to said second latch means and manually operable between an open position and a closed position for coupling said second signals to said control means only when in said closed position and a shutdown switch connected to said second latch means and manually operable between an open position and a closed position for coupling said second signals to said control means only in said closed position;
said third switch means comprising an auto shutdown switch operable between an open position and a closed position for initiating the generation of said sequence of shutdown signals only when operated to said closed position;
said second latch means responsive to said autostart switch, to said auto shutdown switch, to said start switch, to said shutdown switch, and to said momentary signals indicating said engine conditions for enabling said first signals and said shutdown signals whenever one of the enabled autostart switch and said auto shutdown switch is operated to said closed position, for disabling said first signals and said shutdown signals whenever one of said start switch and said shutdown switch is in the closed position, and for disabling said first signals and said shutdown signals upon receiving one of said momentary signals indicating a stabilized idle or completed shutdown engine condition.

8. A starting apparatus as claimed in claim 1 wherein said second switch means comprises a start switch connected to said first latch means and manually operable between an open position and a closed position for coupling said second signals to said control means only when in said closed position, and said second switch means further comprises a shutdown switch connected to said first latch means and manually operable between an open position and a closed position for coupling said second signals to said control means only when in said closed position, said first latch means responsive to said start switch and to said shutdown switch for maintaining said first switch means disabled whenever either of said start switch and said shutdown switch are in the open position.

9. A starting apparatus as claimed in claim 1 wherein said first switch means comprises an autostart switch connected to said first latch means and operable between an open position and a closed position for initiating the generating of said sequence of first signals only when operated to said closed position, said first latch means responsive to said autostart switch for disabling said autostart switch upon operation of said autostart switch to the closed position.

10. A starting apparatus as claimed in claim 1 wherein said second switch means comprises a start switch connected to said first latch means and manually operable between an open position and a closed position for coupling said second signals to said control means only when in said closed position, said first latch means responsive to said start switch for disabling said first switch means upon operation of said start switch to the closed position.

11. A starting apparatus as claimed in claim 1 wherein said first switch means comprises an autostart switch connected to said first latch means and operable between an open position and a closed position for initiating the generation of said sequence of first signals only when operated to said closed position, and said second switch means comprises a start switch connected to said first latch means and manually operable between an open position and a closed position for coupling said second signals to said control means only when in said closed position, said first latch means responsive to said autostart switch for disabling said autostart switch upon operation of said autostart switch to the closed position, and said first latch means responsive to said start switch for disabling said first switch means upon operation of said start switch to the closed position.

12. A starting apparatus as claimed in claim 1 wherein said first switch means comprises an autostart switch connected to said first latch means and operable between an open position and a closed position for initiating the generation of said sequence of first signals only when operated to said closed position, and said second switch means comprises a shutdown switch connected to said first latch means and manually operable between an open position and a closed position for coupling said second signals to said control means only when in said closed position, said first latch means responsive to said shutdown switch for maintaining said autostart switch disabled until said shutdown switch is operated to said closed position.

13. A starting apparatus as claimed in claim 1 wherein said first switch means comprises an autostart switch connected to said first latch means and operable between an open position and a closed position for initiating the generation of said sequence of first signals only when operated to said closed position, said first means includes means for generating a sequence of shutdown signals, and said starting apparatus includes third switch means connected to said first means for initiating the generation of said sequence of shutdown signals, said third switch means comprising an auto shutdown switch operable between an open position and a closed position for initiating the generation of said sequence of shutdown signals only when operated to said closed position, said first latch means responsive to said auto shutdown switch for maintaining said autostart switch disabled until said auto shutdown switch is operated to said closed position.

14. A starting apparatus as claimed in claim 1 wherein:
said first means includes means for generating a sequence of shutdown signals and said starting apparatus includes third switch means connected to said first means for initiating the generation of said sequence of shutdown signals;
said first switch means including an autostart switch connected to said first latch means and operable between an open position and a closed position for initiating the generation of said sequence of first signals only when operated to said closed position;
said second switch means comprising a start switch connected to said first latch means and manually operable between an open position and a closed position for coupling said second signals to said control means only when in said closed position and a shutdown switch connected to said first latch means and manually operable between an open position and a closed position for coupling said second signals to said control means only in said closed position;
said third switch means comprising an auto shutdown switch operable between an open position and a closed position for initiating the generation of said sequence of shutdown signals only when operated to said closed position;
said first latch means responsive to said autostart switch, to said auto shutdown switch, to said start switch, and to said shutdown switch for disabling said autostart switch upon operation of one of said start switch and said autostart switch to the closed position and for maintaining said autostart switch disabled until one of said shutdown switch and said auto shutdown switch is operated to said closed position.

15. A starting apparatus as claimed in claim 1 wherein:
said first means includes means for generating a sequence of shutdown signals and said starting apparatus includes third switch means connected to said first means for initiating the generation of said sequence of shutdown signals;
said first switch means including an autostart switch connected to said first latch means and operable between an open position and a closed position for initiating the generation of said sequence of first signals only when operated to said closed position;
said second switch means comprising a start switch connected to said first latch means and manually operable between an open position and a closed position for coupling said second signals to said control means only when in said closed position and a shutdown switch connected to said first latch means and manually operable between an open position and a closed position for coupling said second signals to said control means only in said closed position;
said third switch means comprising an auto shutdown switch operable between an open position and a closed position for initiating the generation of said sequence of shutdown signals only when operated to said closed position;
said first latch means responsive to said autostart switch, to said auto shutdown switch, and to said shutdown switch for disabling said autostart switch upon operation of one of said start switch and said autostart switch to the closed position, for maintaining said autostart switch disabled until one of said shutdown switch and said auto shutdown switch is operated to said closed position, and for maintaining said first switch means disabled whenever either of said start switch and said shutdown switch are in said open position.

16. A starting apparatus as claimed in claim 7 wherein said first latch means is responsive to said autostart switch, to said auto shutdown switch, to said start switch, and to said shutdown switch for disabling said autostart switch upon operation of one of said start switch and said autostart switch to the closed position, for maintaining said autostart switch disabled until one of said shutdown switch and said auto shutdown switch is operated to said closed position, and for maintaining said first switch means disabled whenever either of said start switch and said shutdown switch are in said open position.

17. A starting apparatus for a gas turbine engine, said starting apparatus comprising:
engine starting equipment connected to the engine,
signal generating means for automatically generating a sequence of first command signals,
a signal source for providing a second command signal,
a control circuit connected between said signal generating means and said engine starting equipment and between said signal source and said engine starting equipment,
a first start switch operable between an open position and a closed position and connecting said signal source to said control circuit when said first start switch is in said closed position,
a first shutdown switch operable between an open position and a closed position and connecting said signal source to said control circuit when said first shutdown switch is in said closed position,
a second start switch operable between an open position and a closed position and connected to said signal generating means for initiating the generation of said sequence of first command signals upon operation to said closed position,
a first latch circuit including an output stage connected to said second start switch and an input stage connected to said first start switch, to said second start switch, and to said first shutdown switch;
said first latch circuit enabling said second start switch whenever said first start switch and said first shutdown switch are both in their open positions, and disabling said second start switch upon the closing of one of said first start switch and said second start switch; and
a second latch circuit including an output stage connected to said signal generating means and an input stage connected to said first start switch, to said second start switch, and to said first shutdown switch;
said second latch circuit enabling said first command signals upon the closing of said second start switch and disabling said first command signals upon the closing of one of said first start switch and said first shutdown switch.

18. A starting apparatus for a gas turbine engine as claimed in claim 17 wherein said signal generating means generates a momentary signal indicating a stabilized idle engine condition and a momentary signal indicating a completed shutdown engine condition, said second latch circuit disabling said first command signals in response to either of said momentary signals indicating said engine conditions.

19. A starting apparatus for a gas turbine engine as claimed in claim 17 wherein said signal generating means includes means for generating a sequence of automatic shutdown command signals, and said starting apparatus includes a second shutdown switch operable between an open and a closed position and connected to said signal generating means and to said second latch circuit, said second shutdown switch operable to said closed position for initiating the generation of said automatic shutdown command signals and for enabling said first command signals and said shutdown command signals through said second latch circuit.

20. A starting apparatus for a gas turbine engine as claimed in claim 17 wherein said signal generating means includes means for generating a sequence of automatic shutdown command signal, and said starting apparatus includes a second shutdown switch operable between an open position and a closed position and connected to said signal generating means and to said first latch circuit, said second shutdown switch operable to said closed position for initiating the generation of said automatic shutdown command signals, said first latch circuit enabling said second start switch only upon one of said first shutdown switch and said second shutdown switch being operated to the closed position.

* * * * *